United States Patent [19]

Hara et al.

[11] Patent Number: 5,313,794
[45] Date of Patent: May 24, 1994

[54] FLUID COUPLING

[75] Inventors: Takashi Hara, Chiryu; Koji Maeda, Anjo; Kunio Morisawa, Toyota; Ryoji Habuchi, Nishikamo, all of Japan

[73] Assignee: Aisin Aw Co., Ltd., Japan

[21] Appl. No.: 893,421

[22] Filed: Jun. 8, 1992

[30] Foreign Application Priority Data

Jun. 7, 1991 [JP] Japan .................. 3-162499

[51] Int. Cl.$^5$ .............................. F10D 33/00
[52] U.S. Cl. ............................................ 60/365
[58] Field of Search ................. 60/330, 364, 365

[56] References Cited

U.S. PATENT DOCUMENTS

| | | | |
|---|---|---|---|
| 2,378,844 | 6/1945 | Hall | 60/365 |
| 3,232,138 | 2/1966 | Burckhardt | 60/347 |
| 3,260,052 | 7/1966 | Stabler | 60/365 |

FOREIGN PATENT DOCUMENTS

| | | | |
|---|---|---|---|
| 76727 | 6/1981 | Japan | 60/330 |
| 1208238 | 8/1989 | Japan . | |
| 2159425 | 6/1990 | Japan . | |

*Primary Examiner*—Edward K. Look
*Assistant Examiner*—F. Daniel Lopez
*Attorney, Agent, or Firm*—Lorusso & Loud

[57] ABSTRACT

A fluid coupling has capacity coefficients in forward and reverse driving which can be arbitrarily selected to comply with demand for a wide variety of characteristics in accordance with the intended application. Pump blades Bp and/or turbine blades Bt are inclined in the direction of rotation of pump impeller P and a turbine runner T with inclination angles $\theta_{2p}$ and $\theta_{2t}$ with respect to normal lines Lp and Lt of the pump and turbine, respectively. Transfer of working fluid between the pump impeller P and the turbine runner T is thereby smoothened or suppressed in accordance with the inclination angles $\theta_{2p}$ and $\theta_{2t}$, and thus the capacity coefficients in both forward and reverse driving can be arbitrarily selected and fixed.

1 Claim, 11 Drawing Sheets

Large Slip ← → Lmall Slip

FLUID COUPLING

BACKGROUND OF THE INVENTION

1. Field of the Invention

The present invention relates to a fluid coupling, and particularly to a fluid coupling without an inner core.

2. Description of the Related Art

A fluid coupling (hereinafter "coupling") operates to transmit power through fluid between a pump impeller and a turbine runner which are opposed to each other. A coupling does not function to increase torque, and thereby differs from a torque converter, but, rather, functions simply as a coupling for transmitting power. Since fluid couplings do not have a stator, they are smaller and light in construction, and thus have been used as starting devices in vehicles.

Couplings are classified in accordance with whether or not they have an inner core for guiding the flow of fluid in the coupling. The "core type" has such an inner core and the "coreless type" lacks the inner core. An "inner core" is shown, for example, as member 8 in U.S. Pat. No. 5,005,356 issued to Saunders and as elements 10b in U.S. Pat. No. 4,866,935 issued to Hayabuchi et al.

Since the flow in the coupling of the coreless type has not been sufficiently analyzed, it is difficult to predict performance when designing a coupling. Further, the fluid in a coupling of the coreless type is rapidly compressed and decompressed when the blades of the impeller and turbine pass each other, which may cause cavitation resulting in vibration and blade noise. Couplings provided with cores have been used in some industrial vehicles, ships, industrial machines and other applications in noisy environments where the noise generated by operation of the coupling is not deemed a problem. However, couplings of the coreless type have not been put to practical use for purposes such as automobiles in which silence is required. Conversely, the performance of the couplings of the core type can be estimated relatively easily. Also, the provision of a core increases the rigidity, and thus the vibration of the blades and the resulting noise can be prevented.

Passenger cars tend to be designed to give the feeling of a high-class car. Automobiles desirably emulate a car equipped with a torque converter and automatic transmission, i.e., a sensation of rapid acceleration responsive to depression of the accelerator pedal and a feeling of coasting when the accelerator pedal is released. With a torque converter, the above sensations can be realized owing to the provision of the stator between the pump impeller and the turbine runner, which stator enables the turbine to have a configuration which optimizes reception of fluid discharged from the pump during forward driving, while minimizing transfer of the fluid from the turbine in reverse driving. Thus, a torque converter generally has a small capacity coefficient when operating in reverse.

Another tendency in automobile design is toward sportiness. Since "sporty" automobiles require rapid response characteristics, it is desirable to have a feeling of acceleration which reflects the engine characteristics during positive acceleration. It is also desirable to provide a strong feeling of engine braking in negative acceleration, i.e., during engine braking in the off-state of the accelerator.

Various gear ratios are provided in automobiles in order to provide a good sensation of acceleration and engine braking. However, in order to comply with the demand for the abovedescribed driving "feel" it is essential to be able to arbitrarily set the capacity coefficient in a coupling.

In known couplings the blades extend radially, i.e., along normal lines, from a center of rotation, and the performance is adjusted by inclining the blades with respect to the rotational axis of the pump and turbine at an appropriate angle $\theta_1$. If the blade angle $\theta_1$ is adjusted to increase the capacity coefficient in forward driving, the capacity coefficient in reverse driving is also increased, so that it is difficult to obtain the desired coasting feeling mentioned above. Thus, if a coupling without a core is designed to increase capacity coefficient in forward driving, a like increase of the capacity coefficient in reverse driving operation can be avoided only to a slight extent, but cannot be eliminated to an extent enabling the desired coasting feeling.

Approaches to solving the above problems have been disclosed in the Japanese Laid-Open Patent Publication Nos. 2-159425 (159425/1990) and 1-208238 (208238/1989). The structure disclosed in the former includes a baffle plate for baffling the flow of fluid so as to suppress the capacity coefficient in reverse. The structure described in the latter publication is designed to reduce the capacity coefficient by reducing the pressure within the coupling.

However, the former technique is applied only to couplings having inner cores for fluid guidance in a coupling provided with a core, the fluid flows between the pump and impeller through an inlet and outlet which are located at constant positions. Therefore, it would be pointless to apply this approach to a coupling without a core, in which the positions of the inlet and outlet are not constant. Further, the baffle plate in the coupling intentionally causes turbulent flow, so that the transmission efficiency decreases, and thus the fuel consumption is lowered. The characteristics in forward driving are also adversely affected. Moreover, the number of parts is increased, resulting in increase of the weight and cost. Additionally, fixing the baffle plate is difficult, and the reliability of the product is compromised.

On the other hand, the latter prior art approach in which the internal pressure is adjusted, requires complicated control, and also requires a dedicated circuit for reducing the internal pressure, resulting in an increase in the number of parts and thus an increase in cost.

In view of the foregoing, it is an object of the invention to provide a coupling, in which an inner core is eliminated to reduce the number of parts and improve the performance, while capacity coefficients in the forward and reverse driving can be freely set so as to comply with various demands depending on types and specifications.

SUMMARY OF THE INVENTION

In order to overcome the above-noted disadvantages, the present invention provides a fluid coupling including a bladed pump impeller and a bladed turbine runner which transfer working fluid between each other. The fluid of the present invention has no inner core and no baffle plate. The entire lengths of the blades of at least one of the pump impeller and the turbine runner are inclined in the direction of rotation of the pump impeller and the turbine runner, at an angle inclined with respect to radial lines of the pump impeller and the turbine runner.

In the coupling thus constructed according to the present invention, the pump blades and/or the turbine blades are inclined in the direction of rotation of the pump impeller and the turbine runner at angles inclined with respect to the radial lines thereof, respectively, so that the transfer of the working fluid between the pump impeller and the turbine runner is enhanced or suppressed in accordance with the inclination angles.

According to the invention, therefore, a coupling without a core can be provided with selected capacity coefficients for both forward and reverse driving. The combination of blade angles, which have been known as a factor for adjusting the capacity coefficient, and the angles of inclination enable selection of characteristics over a wide range and fine setting thereof.

The inclined blades naturally form a relative blade angle preventing the rapid compression and release of the fluid, which may be caused when the blades of the pump impeller and the turbine runner pass each other. Therefore, cavitation is suppressed, so that vibration of the blades and thus the noise can be suppressed, which is a remarkably effective secondary advantage in practical use.

The foregoing and other objects, features, aspects and advantages of the present invention will become more apparent from the following detailed description of the present invention, when read in conjunction with the accompanying drawings.

DETAILED DESCRIPTION OF THE PREFERRED EMBODIMENTS

Figure 1:
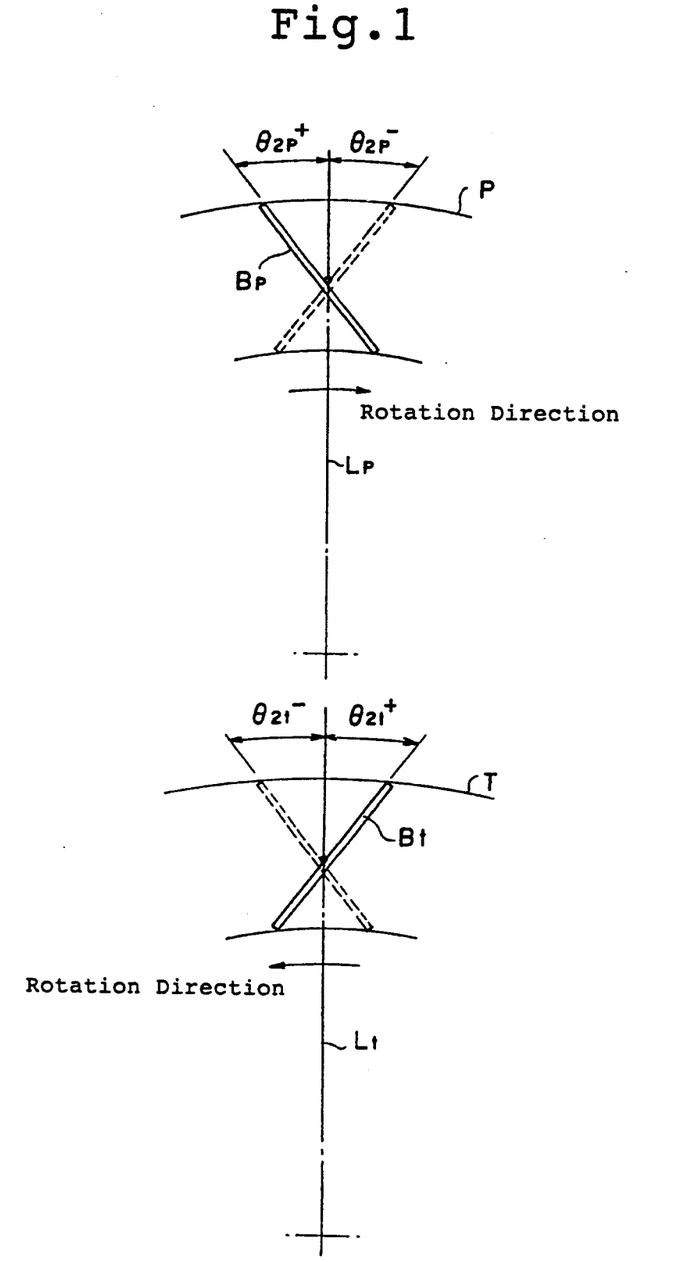
FIG. 1 is a front view illustrating the principle of the coupling of the present invention.

The upper half of the FIG. 1 shows a blade of a pump impeller (also referred to hereinafter as "pump"), and the lower half shows a blade of a turbine runner (also referred to herein as "turbine"). FIG. 1 represents a coupling which includes a pump P and a turbine T, having a large number of blades Bp and Bt respectively (only one blade Bp and one blade Pt are shown in FIG. 1), but is without an inner core. These blades Bp and Bt are inclined in the direction of rotation of the pump P and turbine T, and thus have inclination angles $\theta_{2p}$ and $\theta_{2t}$ with respect to radial lines Lp and Lt, respectively.

The above inclination angles $\theta_{2p}$ and $\theta_{2t}$ theoretically represent an inclination in the direction of rotation with respect to an average stream line (flow passage) obtained by averaging the fluid flows over the entire range of operation. In the coupling without a core, however, it is impossible to define the average stream line, as can be done in the conventional couplings provided with cores and in torque converters. Therefore, in the embodiments to be described, the inclination angles are defined as inclination angles of the blades with respect to the normal lines Lp and Lt intersecting midpoints of the blades. Further, purely theoretical analysis is impossible for the above reason. In the description to follow, therefore, the flow of fluid is estimated on the basis of known theory from patterns observed in a series of experiments. In these experiments, the capacity coefficients in forward and reverse driving were measured for couplings provided with the blades Bp and Bt of the pump and turbine at various angles of inclination $\theta_{2p}$ and $\theta_{2t}$ (plus and minus indicate directions of inclination with respect to the normal lines Lp and Lt).

Figure 2:
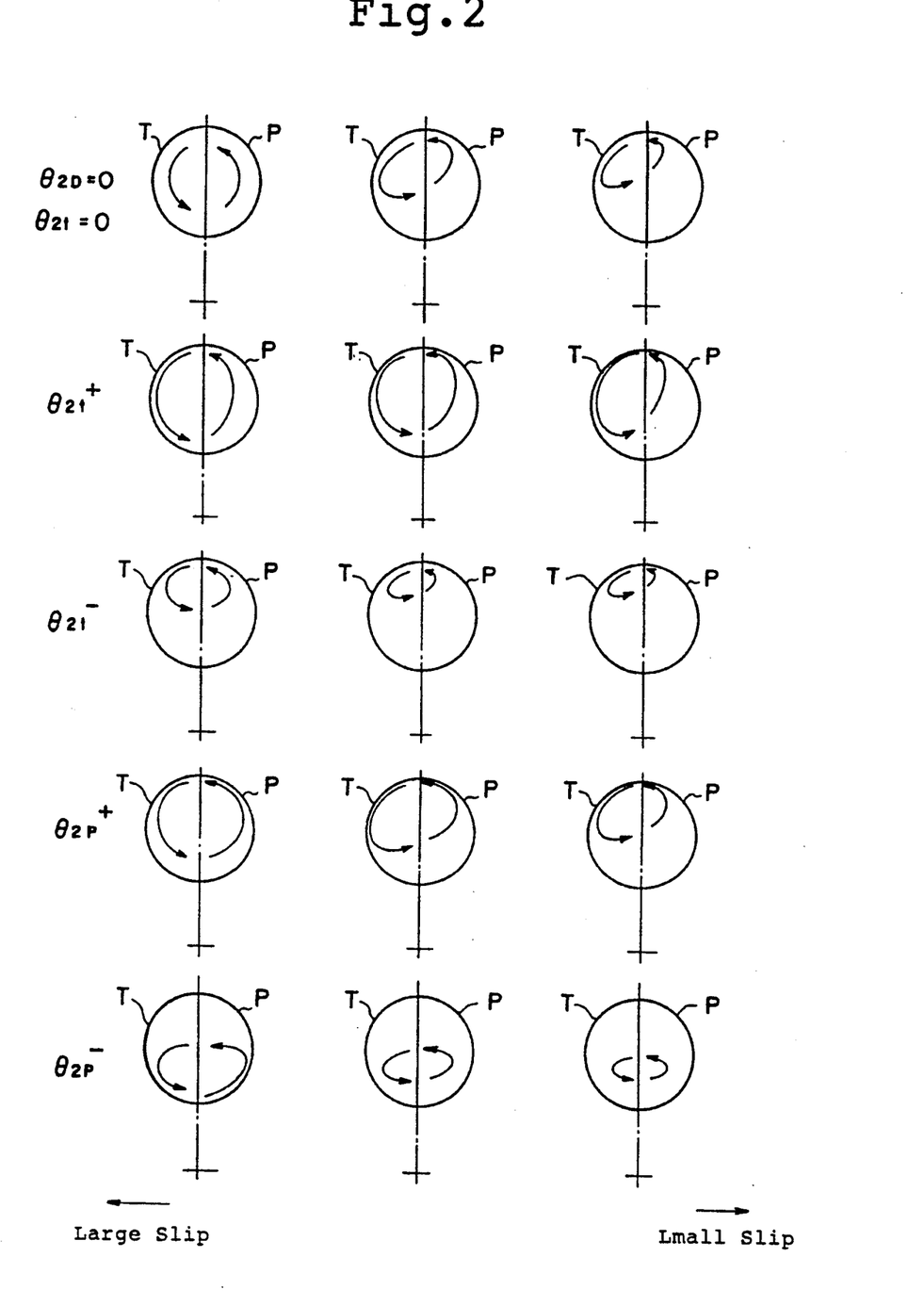
FIG. 2 is a side view schematically showing flow of fluid in a coupling of the present invention.
Figure 3:
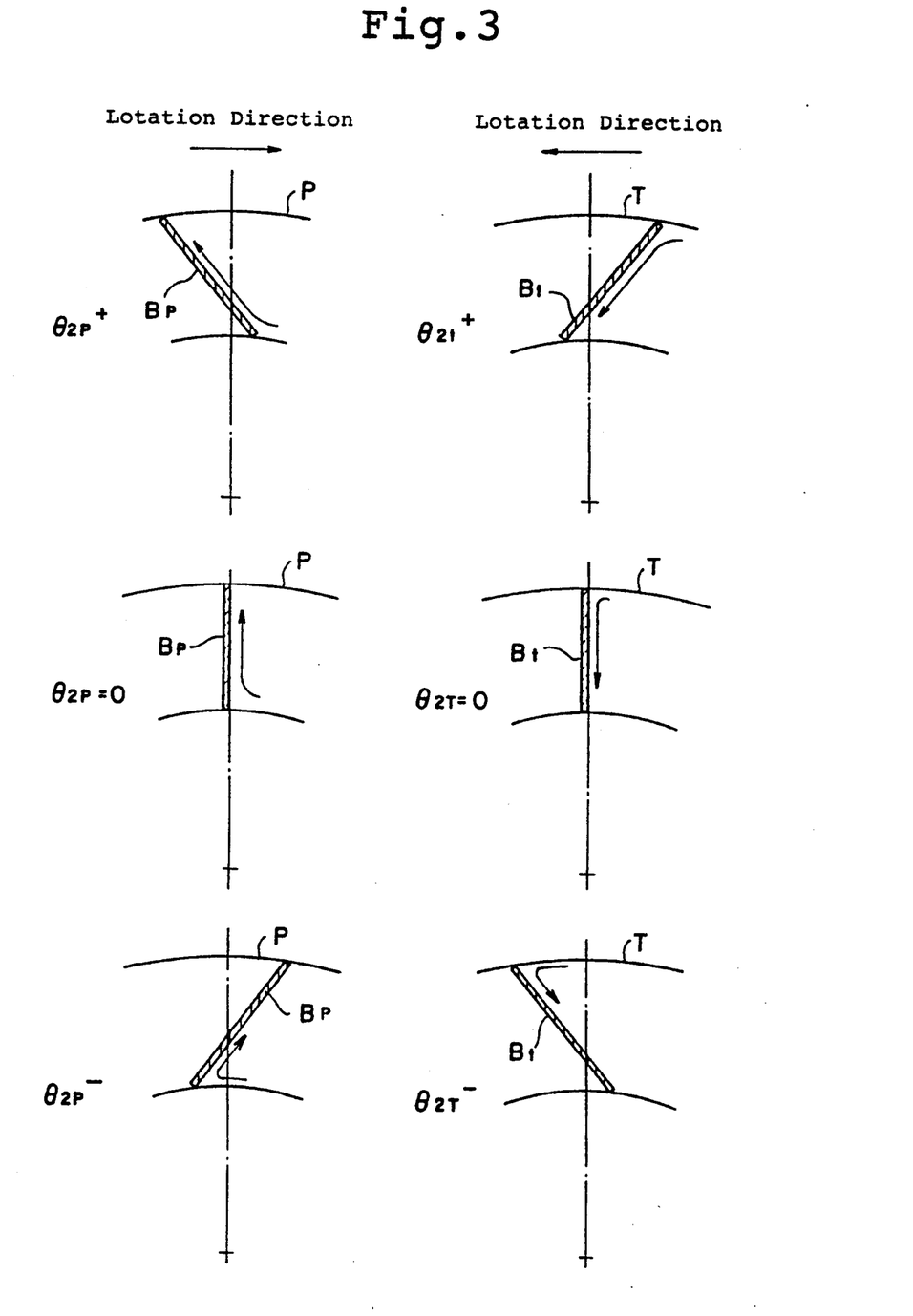
FIG. 3 is a front view schematically showing flow of fluid in a coupling of the present invention.

FIG. 2 is a side view schematically showing an average stream line for the flow of fluid within the coupling. The diagrams to the left in the FIG. show a state of a large degree of slip, and the diagrams to the right show a state of low slip. FIG. 3 is a front view showing the flow of fluid at inlet/outlet sections in the coupling. Referring to these figures, the flow of fluid in the coupling will be described below.

If both the inclination angles $\theta_{2p}$ and $\theta_{2t}$ shown in the uppermost row in FIG. 2 are 0, the average stream line has a circular form with high slip, and it flattens into an elliptical form shifted toward the turbine T in accordance with reduction of the slip. As shown by the second row of diagrams in FIG. 2, if the blades of the turbine T have positive inclination angles $\theta_{2t}$, the stream line has a diameter larger than that in the above described case, because the fluid flows into the turbine T through the radially outer side toward the radially inner side, as shown at $\theta_{2t+}$ in FIG. 3, and thus pushes the turbine T to accelerate it. The circulating flow pattern of a large diameter thus formed increases the capacity coefficient.

If the inclination angle $\theta_{2t}$ of the blades of the turbine T is negative, as shown in the middle row in FIG. 2, the fluid flowing into the turbine T through the radially outer side is baffled to acutely change its direction, as shown at $\theta_{2t-}$ in FIG. 3, resulting in a large loss of pushing force. Immediately after impacting the turbine blades, the fluid flows radially outwardly, and immediately flows into the pump P. As a result, the fluid forms a small diameter circulating flow path at the radially outer side, resulting in a small capacity coefficient.

Conversely, if the blades of the pump P have the positive inclination angle $\theta_{2p}$, the fluid flows in a manner similar to the foregoing, although the pump is the element at the discharge side. Specifically, the fluid discharged from the turbine T flows into the pump P through the radially inner side, as shown at $\theta_{2p+}$ in FIG. 3. The fluid is accelerated in an oblique direction and is pushed radially outwardly. Therefore, the fluid forms a large diameter circulating flow path as shown by the fourth row of diagrams in FIG. 2, resulting in a large capacity coefficient. If the pump blades have the negative inclination angle $\theta_{2p-}$, the fluid tends to flow in an acute direction, so that the fluid pushed radially outwardly is baffled and therefore circulates in a radially inward region, resulting in a small capacity coefficient. A proper combination of these inclination angles $\theta_{2p}$ and $\theta_{2t}$ of the pump and turbine blades enables selected capacity coefficients to be set for both forward and reverse driving.

Figure 4:
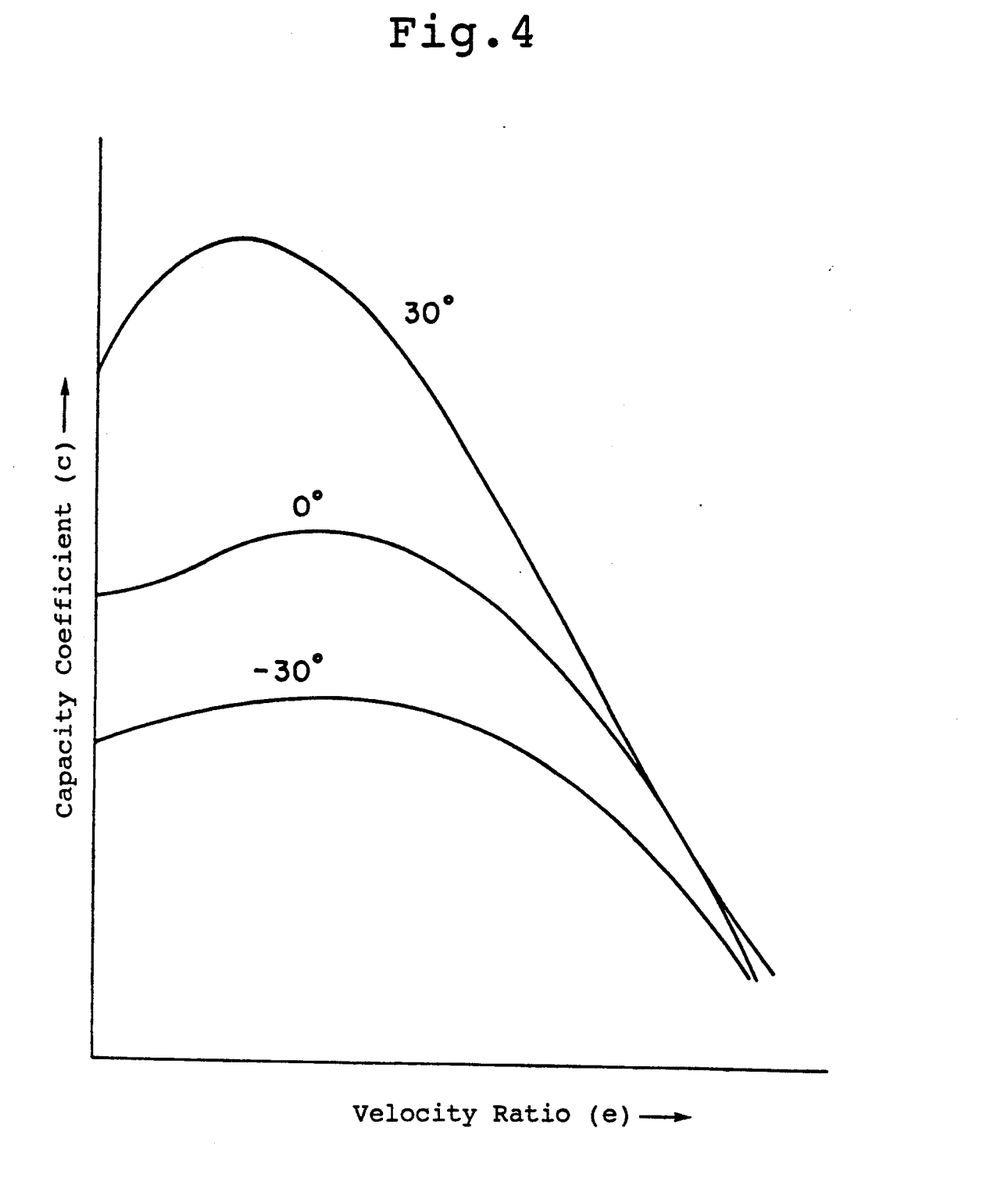
FIG. 4 is a graph showing change of capacity coefficient in forward driving operation with a fixed angle of inclination at the turbine side and variation of the angle of inclination at the pump side.

FIGS. 4-7 are graphs showing influence on the capacity coefficients c by the inclination angles $\theta_{2p}$ and $\theta_{2t}$. FIG. 4 is a graph showing change in the capacity coefficient with change in the velocity ratio in forward driving with the inclination angle $\theta_{2t}$ of the turbine blade fixed at $-30$ degrees and the inclination angle $\theta_{2p}$ of the pump blade varied. In this graph, the abscissa represents a speed ratio e. As can be seen from this graph, an increase in the inclination angle $\theta_{2p}$ of the pump blades increases the capacity coefficient c, and a decrease thereof decreases the capacity coefficient c.

Figure 5:
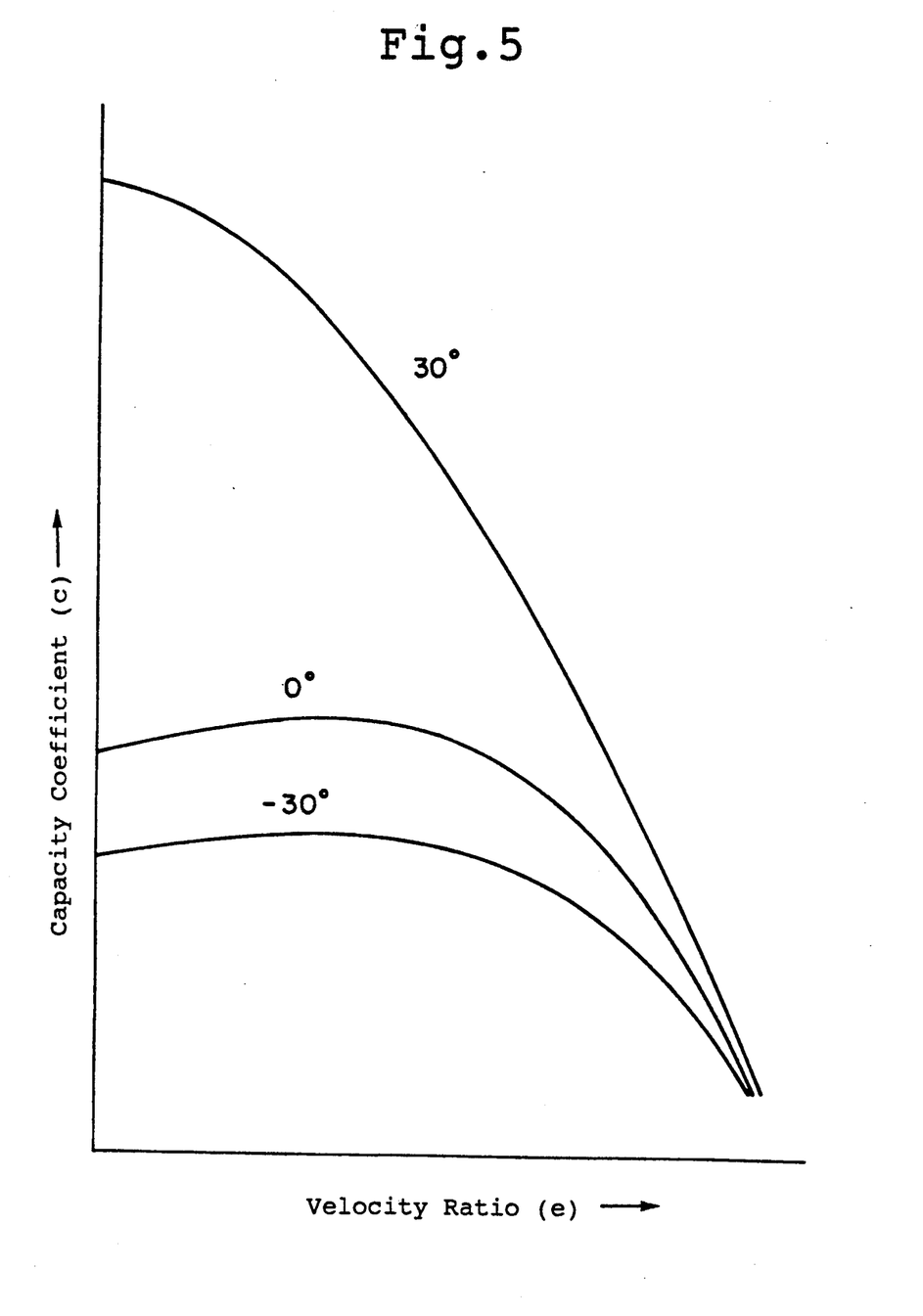
FIG. 5 is a graph showing change of capacity coefficient in reverse driving with the angle of inclination at the turbine side fixed and the angle of inclination at the pump side varied.

FIG. 5 is a graph similar to that of FIG. 4 but for reverse driving. Curves similar to those of FIG. 4 are seen in reverse driving. Particularly, it can be seen that the capacity coefficient c in reverse driving exceeds that in the forward driving if the inclination angle $\theta_{2p}$ of the pump blade is increased sufficiently.

Figure 6:
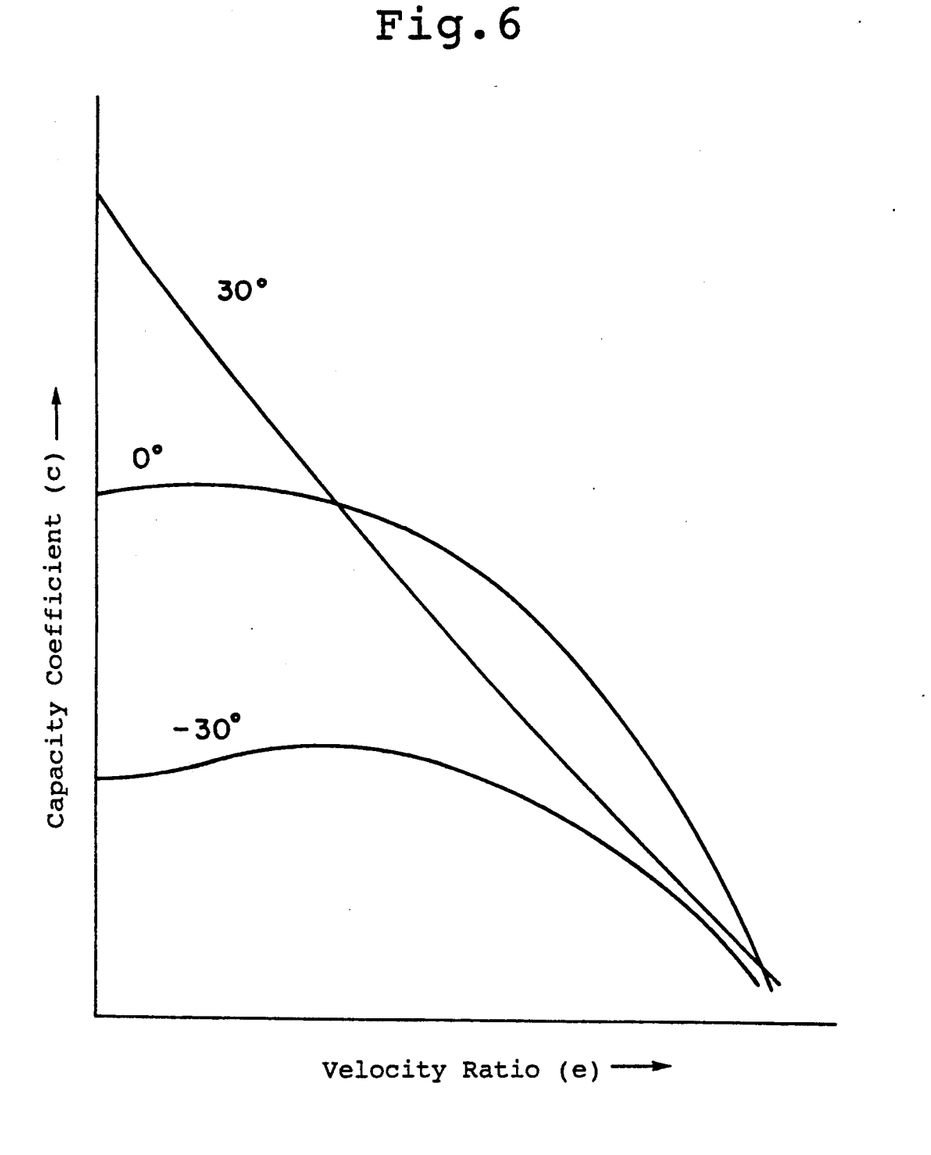
FIG. 6 is a graph showing change of capacity coefficient in forward driving with the angle of inclination at the pump side fixed and the angle of inclination at the turbine side varied.

FIG. 6 is a graph for forward driving with the inclination angle $\theta_{2p}$ of the pump blades at 0 degrees and the inclination angle $\theta_{2t}$ of the turbine blades varied. In this graph, the abscissa represents the speed ratio e. As can be seen from this graph, an increase in the inclination angle $\theta_{2t}$ of the turbine blades increases the capacity coefficient c, and a decrease thereof decreases the capacity coefficient c.

Figure 7:
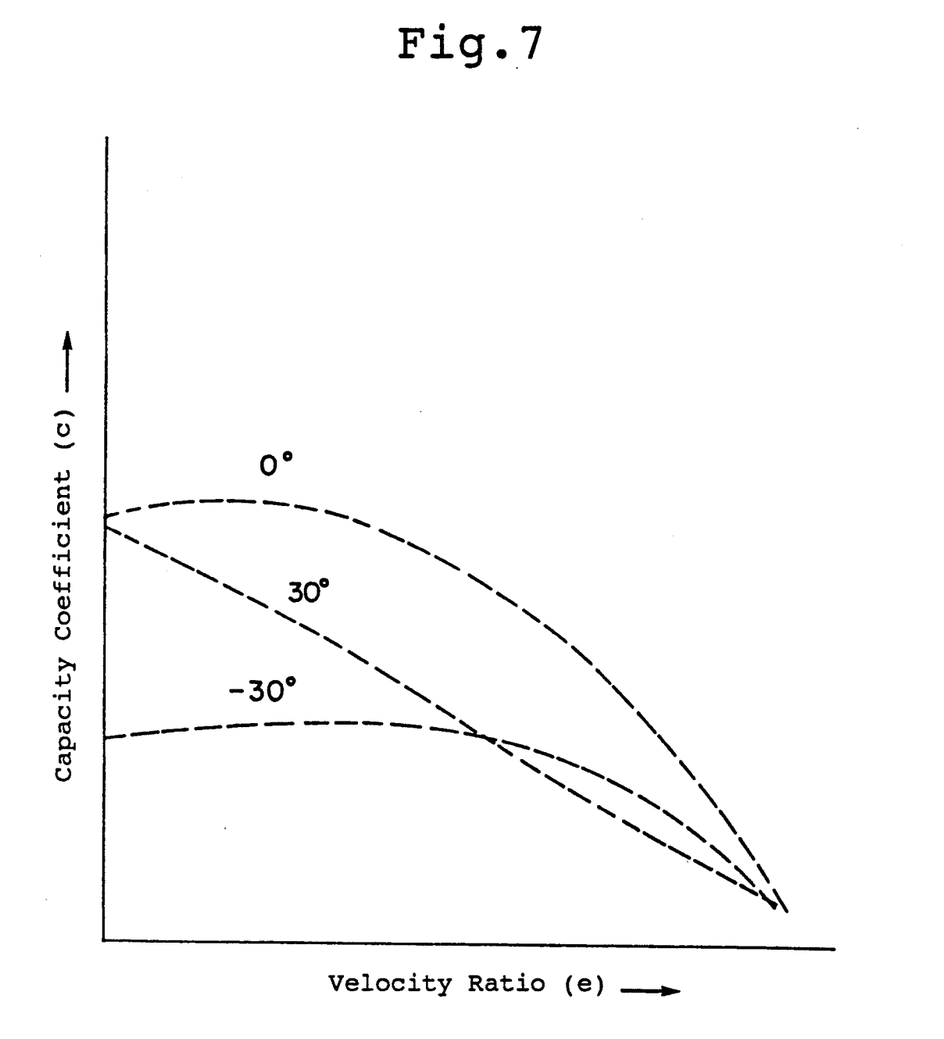
FIG. 7 is a graph showing change in capacity coefficient in reverse driving with the angle of inclination at the pump side fixed and the angle of inclination at the turbine side varied.

FIG. 7 is a graph similar to that of FIG. 6 but for reverse driving. Curves similar to those of FIG. 6 are seen in reverse driving. However, there is no tendency for the capacity coefficient c in reverse driving to exceed that in forward driving, even if the inclination angle $\theta_{2t}$ of the turbine blade is increased.

Figure 8:
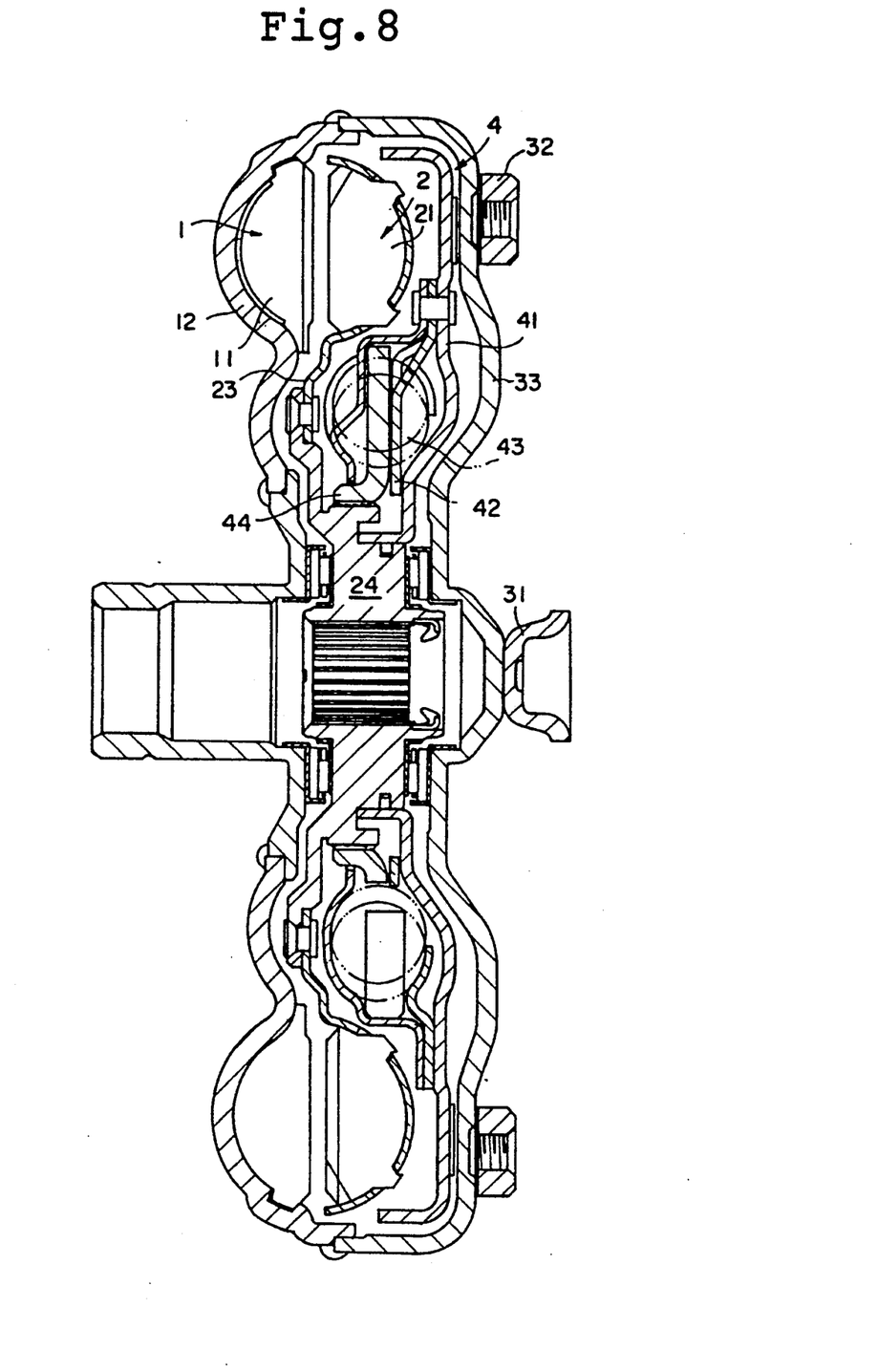
FIG. 8 is a sectional side view showing a starting device of an embodiment of the invention combined with a CVT.
Figure 9:
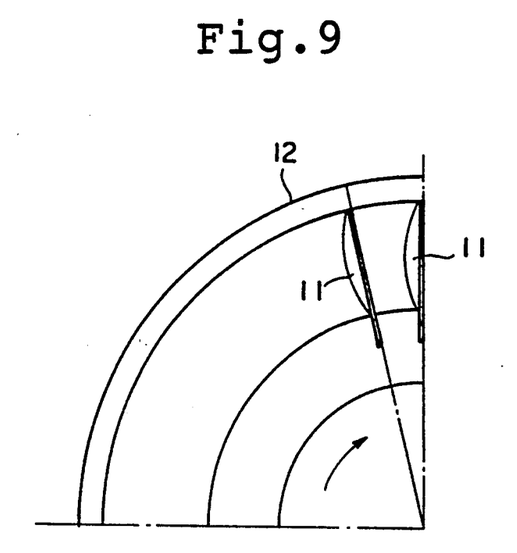
FIG. 9 is a front view of a pump blade in the embodiment shown in FIG. 8.
Figure 10:
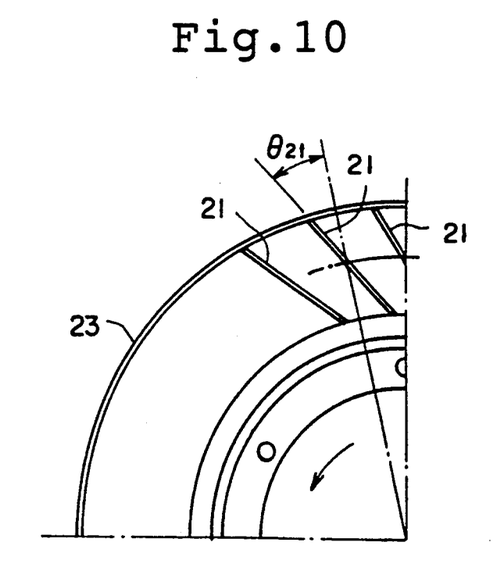
FIG. 10 is a front view of a turbine blade in the embodiment shown in FIG. 8.

FIG. 8 is a sectional side view of an embodiment of a starting device, in which a lockup clutch is associated with the coupling of the present invention to provide a combination suitable for use with a continuously variable transmission (hereinafter IICVTII) of a V-belt type. FIGS. 9 and 10 are front views of the pump and turbine in FIG. 8, respectively. This starting device includes a coupling formed of pump 1, a turbine 2 and a lockup clutch 4. The starting device further includes a coupling cover 33 which has a boss 31 coaxially engaged with an output shaft of an engine and which is fixed to the engine drive plate through a spacer 32, a pump shell 12 welded to the cover 33, a turbine hub 24 which is splined to an input shaft of the CVT and which carries a turbine shell 23 riveted thereto. A lockup clutch piston 41 is axially slidably mounted on the turbine hub 24 and carries a drive plate 42 riveted thereto. A driven plate 44 is splined onto the turbine hub 24 and, together with the driven plate 42, carries damper springs 43.

In this embodiment, the inclination angle $\theta_{2t}$ of the turbine blades 21 is 30 degrees as shown in FIG. 10, and the inclination angle $\theta_{2p}$ of the pump blades 11 is 0 degrees as shown in FIG. 9. The blade angle $\theta_1$ is 115 degrees. These values are selected to improve the capacity coefficient at the intermediate speed ratio to comply with the characteristics of the CVT. The reduction of the capacity coefficient in reverse driving is achieved in the conventional manner, i.e., by proper setting of the blade angle $\theta_1$.

Figure 11:
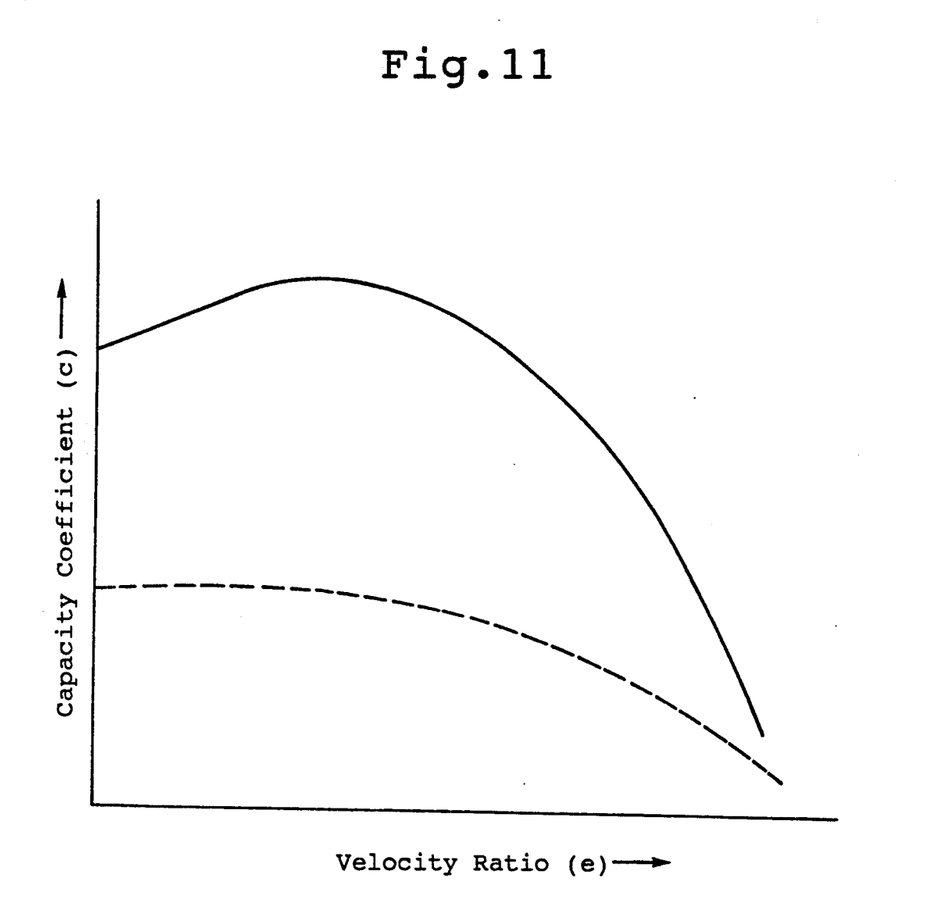
FIG. 11 is a graph showing relationship between speed ratio and capacity coefficient for the device shown in FIG. 8.

FIG. 11 is a graph showing the relationship between the speed ratio and the capacity coefficient in the coupling of the above embodiment. The solid line indicates the capacity coefficient in forward driving, and the dotted line indicates the capacity coefficient in reverse driving.

Figure 12:
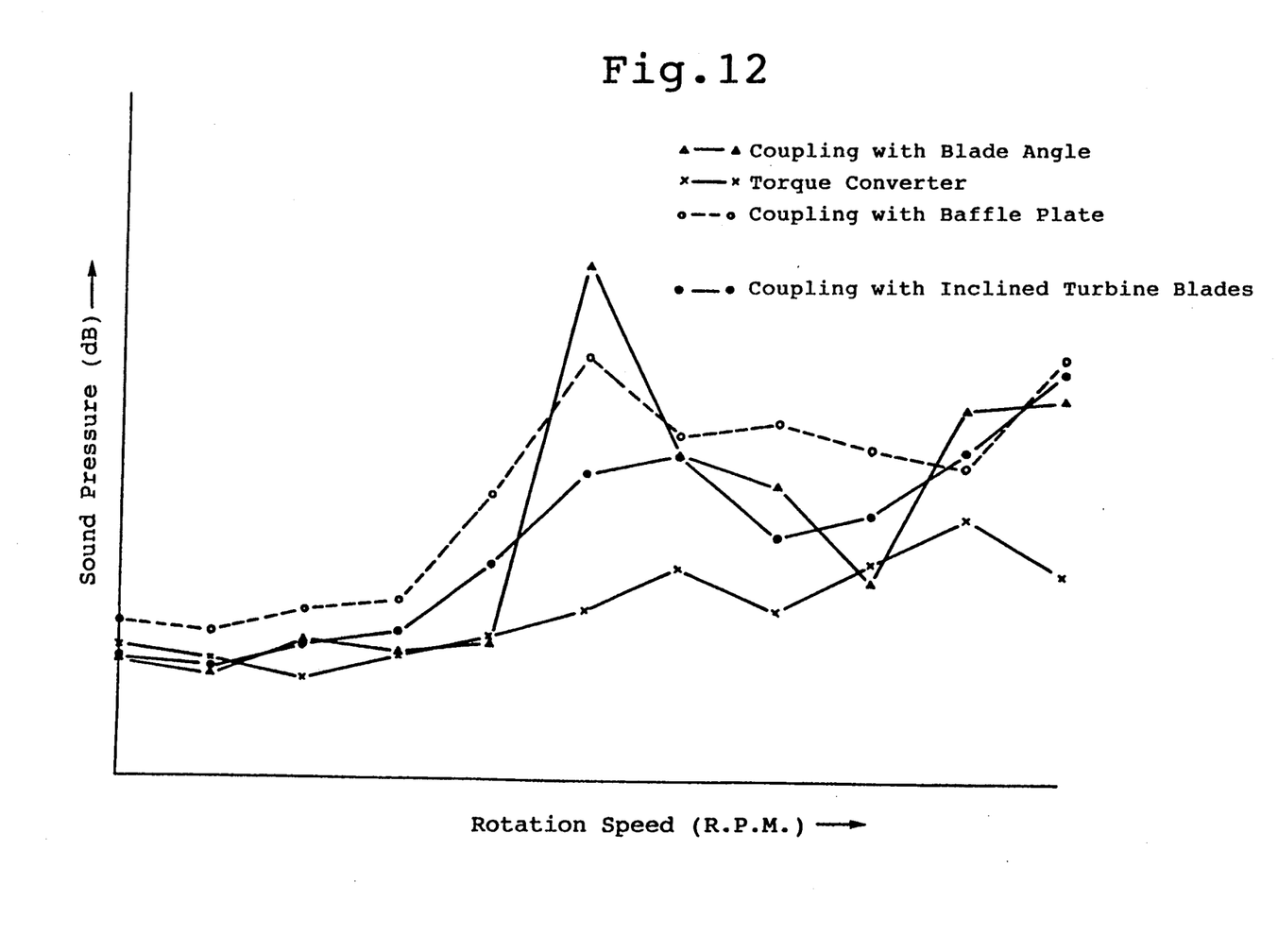
FIG. 12 is a graph showing relationship between rotational speed of a pump and sound pressure at stalling in various couplings.

In the coupling of the embodiment described above, the rapid compression and decompression of the fluid, which is produced when the blades 11 and 12 of the pump 1 and the turbine 2 pass each other, can be avoided owing to the inclination angle $\theta_{2t}$, so that cavitation can be suppressed and thus vibration of the blades 11 and 21 can be prevented. FIG. 12 is a graph showing the relationship between the rotational speed of the pump and the sound pressure at stalling. In FIG. 12, the lowermost curve indicated by marks "X" represents the characteristics of the torque converter, the curve indicated by marks "Δ" represents the characteristics of the coupling having its blades at an inclined angle, the curve indicated by marks "O" represents the characteristics of the coupling provided with the baffle plate, and the curve indicated by represents the characteristics of the coupling of the above-described embodiment.

The invention has been described above with reference to select embodiments. However, the invention is not restricted to the above embodiments, and may be modified in various respects within the meaning of the appended claims. For example, the inclination angle may not be uniform for all blades, and may be different in portions of the turbine and/or pump.

What is claimed is:

1. A fluid coupling without an inner core, comprising:
   a pump impeller for connection to an output shaft of a vehicle engine, said pump impeller having a plurality of pump blades;
   a turbine runner for connection to a vehicle transmission to establish a fluid coupling in cooperation with said pump impeller, said turbine runner having a plurality of turbine blades, said apparatus having no inner core for guiding flow of fluid between said pump impeller and said turbine runner; and
   said blades of at least one of said pump impeller and said turbine runner being inclined at a negative angle $\theta-$ of approximately 30°, in the direction of forward rotation, with respect to radial lines of said pump impeller and said turbine rubber.

* * * * *

UNITED STATES PATENT AND TRADEMARK OFFICE
CERTIFICATE OF CORRECTION

PATENT NO. : 5,313,794
DATED : May 24, 1994
INVENTOR(S) : HARA et al

It is certified that error appears in the above-indentified patent and that said Letters Patent is hereby corrected as shown below:

Col. 2, line 1, delete "abovedescribed" and insert --above-described--; and

Col. 5, line 55, "IICVTII" should read --"CVT"--.

Col. 6, line 38, after "by" insert --o--

Signed and Sealed this

Seventh Day of March, 1995

Attest:

BRUCE LEHMAN

Attesting Officer

Commissioner of Patents and Trademarks